Patented Jan. 11, 1944

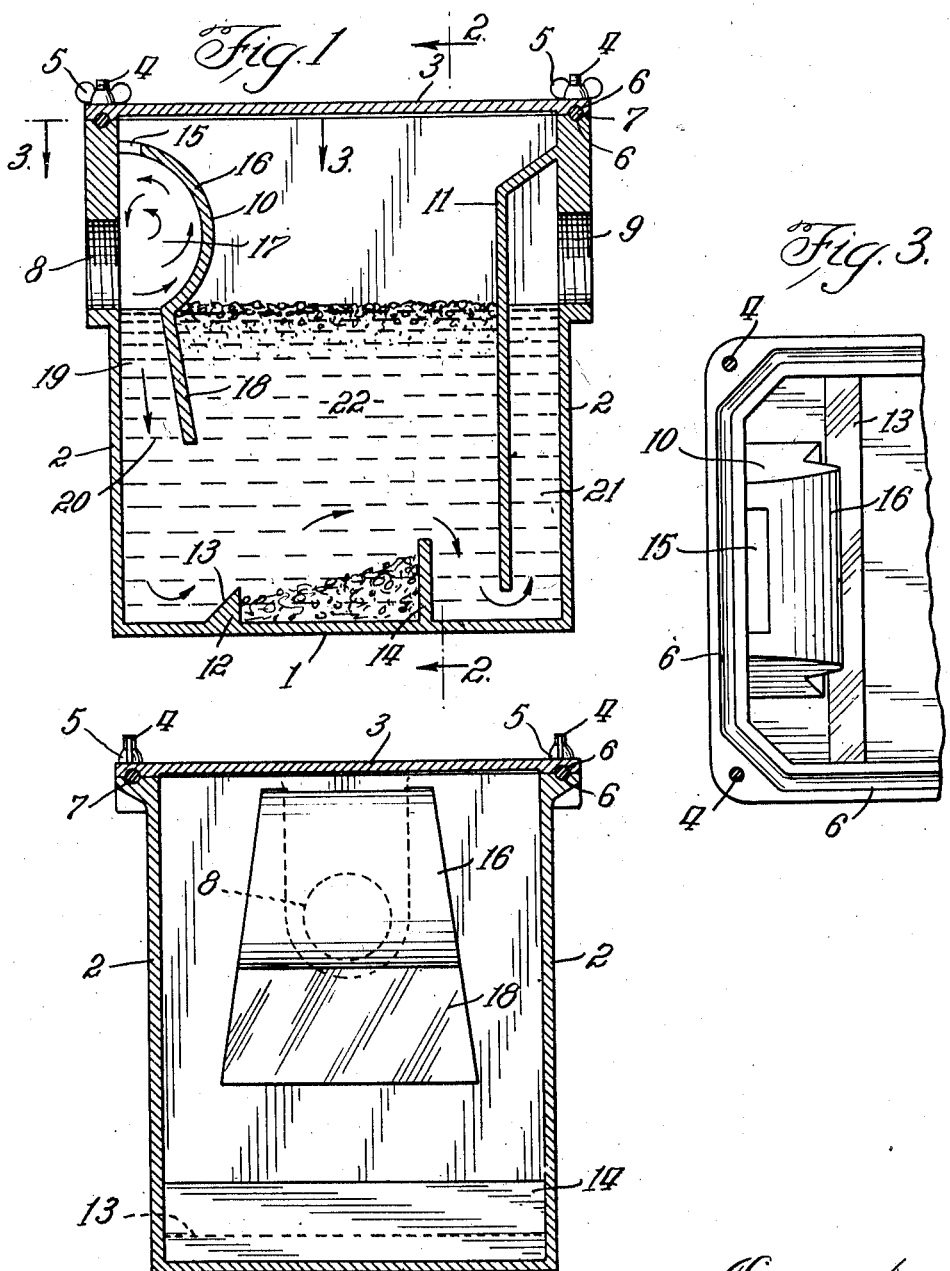

2,338,971

UNITED STATES PATENT OFFICE 2,338,971

GREASE SEPARATOR

Herman Milton Ross, Chicago, Ill., assignor, by mesne assignments, to Illinois Iron & Bolt Company, Carpentersville, Ill., a corporation of Illinois Application April 27, 1942, Serial No. 440,683

5 Claims. (Cl. 182—9)

This invention is directed to new and useful improvements in grease separator.

More particularly this invention is directed to a novel inlet baffle member for use in a grease separator for the purpose of facilitating the separation of the water from the grease particles.

The primary object of this invention is to provide an inlet baffle of novel conformation adapted to direct the flow of incoming liquid in such a manner as will cause a dissociation and reduction of grease or oil particles from the water and sludge.

Another object of this invention is to provide an inlet baffle adapted to direct the flow of the incoming liquid upwardly and then downwardly to reduce the velocity of the liquid and decrease the turbulency.

A further object is to provide a simple and efficient grease separator.

Still another object is to provide an inlet baffle so designed as to facilitate the separation of air entrapped in the incoming liquid.

Other objects and advantages will be apparent from the following detailed description.

In the drawing,

Fig. 1 is a sectional view of a grease separator embodying the invention.

Fig. 2 is a sectional view taken on line 2—2 of Fig. 1.

Fig. 3 is a sectional view taken on line 3—3 of Fig. 1.

The separator is in the form of a closed container having bottom 1, side walls 2, and a removable cover 3, secured in position by means of bolts 4 and wing nuts 5. Grooves 6 are provided along the edges of the cover 3 and the top of the separator in which is positioned an annular gasket 7 formed of an impregnated cord.

The inlet opening is shown at one end of the separator at 8 and the outlet 9 at the opposite end. Inlet baffle member 10 is positioned opposite the inlet 8 and provides an inlet passageway to the separator. Outlet baffle 11 provides an outlet passageway 21 leading from a point near the bottom of the separator upwardly to the outlet 9.

A directional baffle 12 is positioned at the bottom of the separator below the inlet baffle 10, and is provided with an inclined surface 13 adapted to direct the flow of the incoming liquid upwardly.

A sludge baffle 14 provides a vertical dam or weir adjacent the lower end of the outlet baffle 11.

Inlet baffle member 10 is provided with an opening 15 for the release of air entrained in the incoming liquid to the upper part of the separator.

This baffle member has an upwardly curved portion 16 forming a concave deflecting surface opposite inlet opening 8 for the express purpose of directing the incoming liquid upwardly within the baffle as shown by the arrows. This portion curves away from inlet 8 and upwardly and back towards inlet 8 and thus provides a receiving chamber 17 extending above inlet 8. The lower end of curved portion 16 extends to a point about opposite the lower edge of inlet 8. From the lower edge of this curved portion 16 the baffle extends downwardly and slightly away from the end wall of the separator as shown by the straight portion 18. It should be noted from Fig. 2 that inlet baffle 10 is relatively narrow at its top and gradually widens to its lower edge, thus providing an expansion chamber 19 having an outlet 20 below the normal liquid level of the separator.

Obviously the inner conformation of the baffle member forming the receiving chamber 17 may be other than curved, it being only necessary that it be so shaped as to direct the stream of inflowing liquid upwardly and backwardly in a direction opposite to its inflow before being directed downwardly past the inlet opening into the body of the separator. For example, a plurality of plane surfaces tangential to such a curve would accomplish such a result.

In operation the incoming liquid enters inlet 8 under pressure in a horizontal direction and impinges the concave deflecting surface formed by the wall of the curved portion 16 of inlet baffle 10 which throws the stream of incoming liquid upwardly and backwardly and down over itself as shown by the arrows. The impinging effect of the stream on the curved surface and the reversal of the flow of the stream causes a dissociation and reduction of the grease or oil particles from the water and sludge. This facilitates the effective and quick separation of oils and greases from the incoming liquid as it proceeds into the separator.

The expansion chamber 19, by gradually allowing the expansion and enlargement of the incoming flow stream area, reduces the turbulency and velocity of the incoming stream so that when it enters the main chamber 22 of the separator, after leaving the inlet baffle, the flow is evenly dispersed across the entire width of the separator, is non-turbulent and flows at a relatively low velocity.

The directional baffle 6 imparts a slightly upward direction to the flow stream. This non-turbulent, low velocity, directional flow allows the dissociated particles of greases, oils and solids to drop out of the flow stream by virtue of their differences in specific gravities; the greases and oils rising to the top and the solids falling to the bottom where they are held by baffle 14.

The opening 15 provided in the top of chamber 17 communicates with the upper part of the separator above the operating liquid level, for the passage of any entrapped air forced into the trap. This prevents forcing this air into the main chamber 21 of the separator with the flow stream and thus prevents turbulency in the flow stream which would reduce the separating efficiency of the trap.

Sludge baffle 14 prevents channelling along the bottom of the trap which would reduce separating efficiency of the trap and prevents draw off of stored sludge.

The grease and sludge free water passes into outlet passageway 21 from whence it flows upward and out of the trap through outlet 9 into the waste-line connected thereto.

The outlet baffle 11 forming passageway 21 provides a water seal, preventing the passage of gases from the sewer line into the grease trap.

The novel conformation of baffle member 10 whereby the incoming liquid is directed into the upper portion of receiving chamber 17 above inlet 8 not only aids materially as an initial treatment of the material to be separated but aids in forcing air or gas entrained in the liquid from the liquid and through vent 15.

I claim:

1. In a grease separator having an inlet opening leading to the main body of the separator and an outlet opening leading therefrom, the improvement that comprises an inlet baffle member positioned adjacent the inlet opening, said baffle member having a downwardly extending portion defining an inlet passage through which this moving liquid must pass into the main body of the separator and having also a curved surface opposite the inlet opening extending upwardly and away from the lower edge of said inlet opening and curving back towards the inlet opening above the said lower edge so as to direct the flow of incoming liquid upwardly and backwardly within the baffle member before permitting it to pass downwardly through said inlet passage and into the main body of the separator.

2. In a grease separator having an inlet to a separating chamber and an outlet therefrom, the improvement that comprises a baffle member associated with said inlet to provide a downwardly extending passageway through which the incoming liquid must pass from the inlet to the separating chamber below the normal liquid level thereof, said baffle member having a concave deflecting surface opposite the inlet extending upwardly and away from a point opposite the inlet and then in a direction toward a point above the inlet and adapted to direct the stream of inflowing liquid upwardly and backwardly before being directed downwardly through said passageway and into the separating chamber.

3. In a separator having an inlet for receiving a stream of liquid to be separated, a main separating chamber and an outlet for discharging the clear liquid, the improvement that comprises an inlet baffle member associated with the inlet and defining a downwardly extending passage through which all liquid must flow into the separating chamber and comprising also a receiving chamber communicating with said inlet and extending above the inlet, said chamber being provided with a curved deflecting surface extending upwardly and away from the inlet opposite the inlet and in a direction substantially opposed to the direction of liquid inflow above the inlet for directing the incoming liquid into the upper portion of the receiving chamber and reversing its flow direction downwardly through said passage and into the main separating chamber.

4. A separator comprising an inlet opening, an outlet opening, a main separating chamber, an inlet baffle member associated with the inlet opening to provide an inlet passage leading from the inlet opening to the main separating chamber at a point below the inlet opening and through which all inflowing liquid must pass, said inlet baffle member providing a receiving chamber extending above the inlet opening and having a deflecting surface for directing all inflowing liquid into the upper portion of the receiving chamber before it flows downwardly past the inlet opening through the inlet passage into the main separating chamber.

5. In a separator having an inlet opening, an outlet opening and a main separating chamber the improvement that comprises an inlet baffle member associated with the inlet opening to provide an inlet expansion passage leading downwardly from the inlet opening to the main separating chamber and through which all inflowing liquid is compelled to pass, said inlet baffle member formed with a receiving chamber extending from opposite the inlet opening to above it and being closed except for an air vent at its top, a deflecting surface extending upwardly and away from said inlet opening and opposite thereto for directing the liquid from the inlet opening into the upper portion of the receiving chamber before it is permitted to flow downwardly through said expansion passage and into the main separating chamber.

HERMAN MILTON ROSS.